(12) United States Patent
Kullberg

(10) Patent No.: US 12,114,596 B2
(45) Date of Patent: Oct. 15, 2024

(54) TRIMMER HEAD AND TRIMMER

(71) Applicant: HUSQVARNA AB, Huskvarna (SE)

(72) Inventor: Stefan Kullberg, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 1109 days.

(21) Appl. No.: 16/967,044

(22) PCT Filed: Jan. 21, 2019

(86) PCT No.: PCT/EP2019/051326
§ 371 (c)(1),
(2) Date: Aug. 3, 2020

(87) PCT Pub. No.: WO2019/154610
PCT Pub. Date: Aug. 15, 2019

(65) Prior Publication Data
US 2021/0037704 A1    Feb. 11, 2021

(30) Foreign Application Priority Data
Feb. 12, 2018    (SE) .................................... 1850147-8

(51) Int. Cl.
*A01D 34/416*    (2006.01)
(52) U.S. Cl.
CPC ..... *A01D 34/4163* (2013.01); *A01D 34/4162* (2013.01)
(58) Field of Classification Search
None
See application file for complete search history.

(56) References Cited

U.S. PATENT DOCUMENTS 4,483,069 A    11/1984    Moore
4,897,923 A *   2/1990    Collins ............... A01D 34/4162
                                                    29/898.07
(Continued)

FOREIGN PATENT DOCUMENTS

CN    101433146 A    5/2009
CN    202455824 U    10/2012
(Continued)

OTHER PUBLICATIONS

Swedish Search Report for Application No. 1850147-8 mailed Sep. 6, 2018.
(Continued)

*Primary Examiner* — Hwei-Siu C Payer
(74) *Attorney, Agent, or Firm* — Burr & Forman LLP (57) ABSTRACT

A trimmer head (1) is disclosed arranged to be driven around a rotational axis (ax), via an interface (2), to rotate a trimmer line (3). The trimmer head (1) comprises a housing (1a, 1b), the interface (2), a trimmer line spool (5, 5'), and an automatic feed mechanism (7). The automatic feed mechanism (7) is configured to release a trimmer line (3) spooled around the trimmer line spool (5, 5') when the trimmer head (1) is subjected to a change in rotational speed, via the interface (2), at a higher rate than a threshold rate of change in rotational speed. The trimmer head (1) further comprises an actuator (9, 9') connected to the automatic feed mechanism (7) such that a manual actuation of the actuator (9, 9') releases the trimmer line (3) spooled around the trimmer line spool (5, 5'). The present disclosure further relates to a trimmer (13) comprising a trimmer head (1).

20 Claims, 6 Drawing Sheets

(56) References Cited

U.S. PATENT DOCUMENTS

| | | | |
|---|---|---|---|
| 5,109,607 A | | 5/1992 | Everts |
| 5,311,665 A | | 5/1994 | Sugihara et al. |
| 2012/0066913 A1 | * | 3/2012 | Alliss ................. A01D 34/4162 30/276 |
| 2016/0249529 A1 | | 9/2016 | Ma et al. |
| 2021/0037704 A1 | * | 2/2021 | Kullberg ............ A01D 34/4163 |
| 2023/0157205 A1 | * | 5/2023 | Kullberg ............ A01D 34/4162 30/276 |

FOREIGN PATENT DOCUMENTS

| | | | |
|---|---|---|---|
| CN | 103782814 A | | 5/2014 |
| CN | 105934147 A | | 9/2016 |
| CN | 106993429 A | | 8/2017 |
| CN | 107148839 A | | 9/2017 |
| DE | 102007056319 A1 | | 5/2009 |
| EP | 0467006 A1 | | 1/1992 |
| EP | 0 512 784 A1 | * | 11/1992 |
| JP | 2015181475 A | | 10/2015 |
| WO | WO 2016/173657 A1 | * | 11/2016 |
| WO | 2017059917 A1 | | 4/2017 |

OTHER PUBLICATIONS

International Search Report and Written Opinion for International Application number PCT/EP2019/051326 mailed Apr. 24, 2019.

\* cited by examiner

TRIMMER HEAD AND TRIMMER

TECHNICAL FIELD

The present invention relates to a trimmer head arranged to be driven around a rotational axis to rotate a trimmer line. The present invention further relates to a trimmer comprising a trimmer head.

BACKGROUND

A trimmer operates by rotating a trimmer line, or several trimmer lines, at high speed. When the trimmer line hits vegetation, such as grass, the trimmer line cuts the vegetation. The physical interaction between the vegetation and the trimmer line causes the trimmer line to be worn and the trimmer line is typically shortened over time. To provide for an even cutting operation, more line needs to be fed.

A prior art solution is to provide the trimmer with a push button arranged on an underside of a trimmer head. As a user wants to feed more line, the user can do so by pushing the trimmer head to the ground, thereby pushing the push button which causes the line to be fed. However, as the push button protrudes from the trimmer head, this arrangement adds to the cutting height of the trimmer head and is thus unsuitable for a close and precise trimming. Furthermore, the pushing of the trimmer head to the ground causes unwanted circular marks formed in the vegetation.

Development has let to trimmer heads comprising an automatic feed mechanism capable of feeding trimmer line without the intervention of a user. Such trimmer heads are simpler to use than trimmer heads comprising the common push button solution and circumvents the need for pushing the trimmer head to the ground. However, also such trimmer heads are associated with some problems. Examples are user-friendliness, tangling, clamping and welding of the trimmer line. That is, for example if the trimmer line is wrapped in a non-careful manner around the trimmer line spool, e.g. bit loose, there is a risk that the trimmer line clamps, wedges or becomes tangled during operation of the trimmer head. This because a trimmer head rotates at a high rotational speed and because the trimmer line is subjected to centrifugal forces and meets resistance in vegetation when cutting.

During operation of a trimmer head, portions of the trimmer line spooled around a trimmer line spool may be rubbed against each other. As a result thereof, welding of portions of the trimmer line may occur, which means that portions of the trimmer line stick to each other. Such welding may impair the function of the automatic feed mechanism. Further, trimmer lines come in various qualities regarding line material and line surface structure which also may affect the probability of welding of portions of the trimmer line. Tangling, wedging, clamping, and welding of the trimmer line may be burdensome for the user to solve.

SUMMARY

It is an object of the present invention to overcome, or at least alleviate, at least some of the above-mentioned problems and drawbacks.

According to a first aspect of the invention, the object is achieved by a trimmer head arranged to be driven around a rotational axis, via an interface, to rotate a trimmer line. The trimmer head comprises a housing, the interface, a trimmer line spool, and an automatic feed mechanism. The automatic feed mechanism is configured to release a trimmer line spooled around the trimmer line spool, when the trimmer head is subjected to a change in rotational speed, via the interface, at a higher rate than a threshold rate of change in rotational speed. The trimmer head further comprises an actuator connected to the automatic feed mechanism such that a manual actuation of the actuator releases the trimmer line spooled around the trimmer line spool.

Thereby, a trimmer head is provided capable of feeding trimmer line simply by being subjected to a change in rotational speed, via the interface, at a higher rate than the threshold rate. As a result thereof, the feeding of the trimmer line can be performed in a simple manner during operation of the trimmer head. Further, the need for pushing the trimmer head against a ground surface is circumvented, and the formation of unwanted circular marks in the grass can be avoided. Still further, the need for a push button arranged on an underside of a trimmer head is circumvented, which provides conditions for a trimmer head having a low cutting height.

In addition, since the trimmer head comprises the actuator connected to the automatic feed mechanism, a user can perform a manual feed of trimmer line in a simple and quick manner, by actuating the actuator. Accordingly, a trimmer head is provided allowing a user to manually feed trimmer line during standstill of the trimmer head, in a simple manner without having to dissemble the trimmer head. For example, in case the trimmer line becomes too short, the automatic feed mechanism may fail to feed trimmer line, because a centrifugal force acting on the trimmer line may be too small to feed the trimmer line. In the prior art trimmer head comprising an automatic feed mechanism, the user would, in such cases, have to dissemble the trimmer head to be able to feed the trimmer line. However, since the trimmer head provided comprises the actuator connected to the automatic feed mechanism, the user can, also in such cases, feed trimmer line in a simple and quick manner, by actuating the actuator.

As another example, in some cases, the trimmer line may become tangled, wedged, clamped, or welded on the trimmer line spool. In the prior art trimmer head comprising an automatic feed mechanism, the user would, in such cases, have to dissemble the trimmer head to be able to feed the trimmer line. However, since the trimmer head provided comprises the actuator connected to the automatic feed mechanism, the user can, also in such cases, feed trimmer line in a simple and quick manner, by actuating the actuator.

As still another example, dirt, grease and vegetation residues may impair the function of the automatic feed mechanism. As a result thereof, in some cases, the automatic feed mechanism may fail to feed the trimmer line. In the prior art trimmer head comprising an automatic feed mechanism, the user would, in such cases, have to dissemble the trimmer head, remove such dirt and then assemble the trimmer head. However, since the trimmer head provided comprises the actuator connected to the automatic feed mechanism, the user may, also in such cases, be able to feed trimmer line, and/or regain the function of the automatic feed mechanism, simply by actuating the actuator one or more times.

Accordingly, as shown above, a more user-friendly trimmer head is provided capable of feeding trimmer line in a simple manner during operation of the trimmer head and capable of providing a manual release of trimmer line during standstill of the trimmer head. Thus, a trimmer head is provided overcoming, or at least alleviating, at least some of the above-mentioned problems and drawbacks. As a result, the above-mentioned object is achieved.

Optionally, the automatic feed mechanism is configured to release the trimmer line by allowing the trimmer line spool to rotate relative the housing. Thereby, a simple and reliable feed of the trimmer line is provided.

Optionally, the automatic feed mechanism is configured to allow the trimmer line spool to rotate a predetermined angle relative the housing. Thereby, a simple and reliable feed of trimmer line is provided. Further, a predetermined length of the trimmer line is fed when the actuator is manually actuated, and when the trimmer head is subjected to a change in rotational speed, via the interface, at a higher rate than the threshold rate of change. As a result thereof, a surplus feed of the trimmer line is avoided. Thereby, the risk of tangling, wedging, and clamping of the trimmer line is reduced, and the consumption of trimmer line is kept low.

Optionally, the actuator is displaceable between a first position, in which the automatic feed mechanism locks the trimmer line, and a second position in which the automatic feed mechanism releases the trimmer line, and wherein the actuator is biased towards the first position. Thereby, the risk of an unintended displacement of the actuator from the first position is reduced. As a further result thereof, an unintended feed of trimmer line is avoided, which reduces the risk of tangling, wedging, and clamping of the trimmer line and reduces the consumption of trimmer line.

Optionally, the actuator is configured to be manually actuated by being pushed or turned an angle around the rotational axis. Thereby, the risk of an unintended actuation of the actuator is lowered. As a further result thereof, the risk of an unintended feed of trimmer line is lowered which reduces the risk of tangling, wedging, and clamping of the trimmer line, and reduces the consumption of trimmer line. In addition, conditions are provided for a trimmer head having a low height because the actuator does not need to be displaceable in an axial direction, i.e. in a direction conceding with the rotational axis. As a further result thereof, conditions are provided for a trimmer head having a low cutting height which provides conditions for a close and precise trimming.

Optionally, the trimmer head comprises a first portion configured to face a trimmer, and a second portion configured to face away from the trimmer, when the trimmer head is mounted onto the trimmer, and wherein the actuator is arranged at the first portion. Thereby, the risk of an unintended actuation of the actuator is lowered. As a further result thereof, an unintended feed of trimmer line is avoided which reduces the risk of tangling, wedging, and clamping of the trimmer line, and reduces the consumption of trimmer line. In addition, since the actuator is arranged at the first portion configured to face the trimmer, the actuator is protected from dirt, grease and vegetation residues, as well as protected from damages by objects on a ground surface. Further, conditions are provided for a trimmer head having a low cutting height, and a smooth surface of the second portion, which provides conditions for a close and precise trimming.

Optionally, the trimmer head comprises an inner body operably connected to the trimmer line spool, wherein the inner body is configured to move relative the housing when the trimmer head is subjected to said change in rotational speed, via the interface, and wherein the automatic feed mechanism is configured to release the trimmer line spooled around the trimmer line spool, when the inner body moves relative the housing. Thereby, a simple, efficient, and reliable automatic feed mechanism is provided. Further, a simple and reliable connection can be provided between the actuator and the automatic feed mechanism, which allows for a simple, efficient, and reliable manual release of trimmer line.

Optionally, the automatic feed mechanism comprises a mechanism body operably connected to the housing and to the inner body. Thereby, a simple, efficient, and reliable automatic feed mechanism is provided. This because the mechanism body may release the trimmer line spooled around the trimmer line spool when the inner body moves relative the housing. Further, a simple and reliable connection can be provided between the actuator and the automatic feed mechanism, which allows for a simple, efficient, and reliable manual release of trimmer line.

Optionally, the actuator is operably connected to the mechanism body. Thereby, a manual release of trimmer line can be performed in a simple, efficient, and reliable manner. This because a user may cause the mechanism body to release the trimmer line spooled around the trimmer line spool simply by actuating the actuator.

Optionally, the mechanism body is movable in a direction of the rotational axis, and wherein the inner body is configured to displace the mechanism body in the direction of the rotational axis when the inner body moves relative the housing. Thereby, a simple, robust, and reliable automatic feed mechanism is provided. Further, conditions are provided for using a rotationally symmetrical mechanism body which provides conditions for a balanced trimmer head. Still further, effects of centrifugal or centripetal forces acting on the mechanism body will have a low impact on the displacement of inner body, which provides conditions for a consistent and reliable automatic feed mechanism.

Optionally, the mechanism body comprises at least one first stop and at least one second stop each configured to cooperate with at least one stop arranged on the trimmer line spool, and wherein the at least one second stop is arranged a distance from the at least one first stop in a direction of the rotational axis, and at a circumferential distance from the at least one first stop around the rotational axis. Thereby, a simple, efficient, and reliable automatic feed mechanism is provided. Further, conditions are provided for a simple, efficient, and reliable manual release of trimmer line.

Optionally, the mechanism body is rotationally locked to the housing. Thereby, a robust, efficient, and reliable automatic feed mechanism is provided.

Optionally, the actuator is operably connected to the inner body. Thereby, a robust trimmer head is provided allowing a user to perform a manual feed of trimmer line in a simple and efficient manner, for example by grabbing the housing of the trimmer head and actuating the actuator.

Optionally, the mechanism body comprises a locking lever, and wherein the actuator is operably connected to the locking lever. Thereby, a simple, efficient, and reliable automatic feed mechanism is provided. Further, a manual release of trimmer line can be performed in a simple, efficient, and reliable manner by actuating the actuator.

Optionally, the trimmer head further comprises a spring holding member provided with a spring connected to the housing, and wherein the spring holding member connects the actuator to the locking lever. Thereby, an efficient and reliable connection is provided between the actuator and the locking lever, which allows for a simple and efficient manual release of trimmer line.

Optionally, the spring holding member comprises a centrifugal locking device configured to lock the spring holding member to the inner body when the trimmer head rotates at a rotational speed above a threshold rotational speed. Thereby, the spring holding member will move relative the housing, when the inner body moves relative the housing and the trimmer head rotates at a rotational speed above the threshold rotational speed. As a result, conditions are provided for an automatic feed mechanism that only releases trimmer line when the trimmer head rotates at a rotational speed above the threshold rotational speed, or when the actuator is actuated. As a result, an unintended release of trimmer line, at lower rotational speeds, can be avoided, which reduces the risk of tangling, wedging, and clamping of the trimmer line, and reduces the consumption of trimmer line. Further, conditions are provided for a trimmer head capable of operating in two different rotational directions.

Optionally, the trimmer line spool comprises a recess, wherein the recess is provided with at least one radially protruding inner stop on its inner circumferential wall, and at least one radially protruding outer stop on its outer circumferential wall, the at least one inner stop being circumferentially displaced relative the at least one outer stop, and wherein the locking lever is configured to cooperate with the least one radially protruding inner stop and the at least one radially protruding outer stop. Thereby, a simple, efficient, and reliable release of trimmer line can be performed by the interaction between the locking lever and the at least one inner stop and the at least one outer stop. Accordingly, conditions are provided for a simple, efficient, and reliable automatic feed mechanism, as well as a simple, efficient and reliable manual release of trimmer line.

Optionally, the inner body is configured to rotate relative the housing when the trimmer head is subjected to said change in rotational speed, via the interface, and wherein the automatic feed mechanism is configured to release the trimmer line spooled around the trimmer line spool, when the inner body rotates relative the housing. Thereby, a simple, efficient, and reliable automatic feed mechanism is provided. Further, a simple and reliable connection can be provided between the actuator and the automatic feed mechanism, which allows for a simple, efficient, and reliable manual release of trimmer line.

Optionally, the trimmer head comprises at least one spring configured to counteract relative movement between the inner body and the housing. Thereby, a reliable and predictable release of trimmer line is provided.

Optionally, the interface is arranged at the inner body. Thereby, a robust trimmer head is provided. Further, a relative movement between inner body and the housing can be performed in an efficient and reliable manner by subjecting the inner body to a change in rotational speed, via the interface, at a higher rate than the threshold rate of change in rotational speed.

Optionally, the interface is a drive shaft interface. Thereby, a trimmer head is provided capable of being attached to a drive shaft of a trimmer in a simple and reliable manner.

Optionally, the actuator is arranged at a distance from the rotational axis. Thereby, actuation of the actuator is facilitated. Further, the actuator can be positioned at a position of the trimmer head where the actuator is more protected from dirt, grease and vegetation residues, as well as more protected from damages by objects during operation.

According to a second aspect of the invention, the object is achieved by a trimmer comprising a trimmer head according to some embodiments. Since the trimmer comprises a trimmer head according to some embodiments, a more user-friendly trimmer is provided having conditions for an automatic release of trimmer line, as well as a manual release of trimmer line, which, in many cases, circumvents the need for dissemble the trimmer head.

Accordingly, a trimmer is provided overcoming, or at least alleviating, at least some of the above-mentioned problems and drawbacks. As a result, the above-mentioned object is achieved.

Optionally, the trimmer is configured to initiate feed of trimmer line spooled around the trimmer line spool of the trimmer head by performing a change in rotational speed of the trimmer head, via the interface of the trimmer head, at a higher rate than a threshold rate of change in rotational speed. Thereby, a trimmer is provided capable of performing an automatic release of trimmer line, without an intervention of a user, while providing conditions for a simple and reliable manual release of trimmer line.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout. Well-known functions or constructions will not necessarily be described in detail for brevity and/or clarity.

Figure 1:
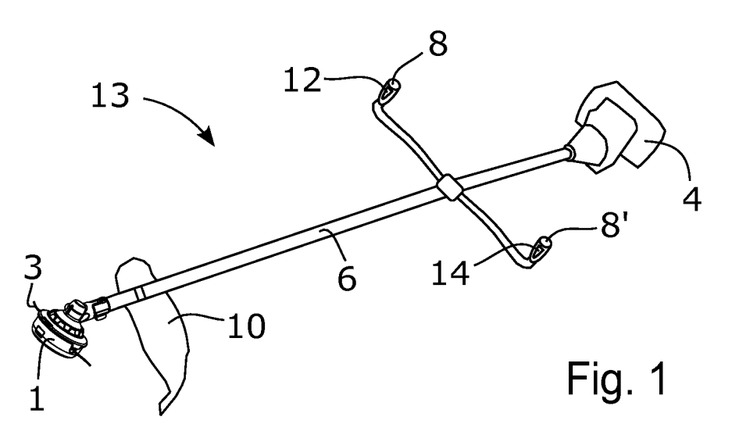
FIG. 1 illustrates a perspective view of a trimmer, according to some embodiments.

FIG. 1 illustrates a perspective view of a trimmer 13 according to some embodiments. The trimmer 13 comprises a power source 4, which in the illustrated embodiments comprises an electric motor. The trimmer 13 may comprise one or more batteries, and/or an electric connector, for supplying electricity to the electric motor. According to further embodiments, the power source 4 comprises a combustion engine and a fuel tank. The trimmer 13 further comprises a trimmer head 1, a pole 6, at least one handle 8, 8', and a trim guard 10. The trimmer head 1, the power source 4, the at least one handle 8, 8', and the trim guard 10 are attached to the pole 6. The power source 4 is configured to rotate the trimmer head 1, via a shaft extending through the pole 6. According to further embodiments, the power source 4 may be arranged at a region of the trimmer head 1. According to such embodiments, the trimmer 13 may lack a shaft extending through the pole 6. Instead, an output shaft of the power source 4 may be connected to an interface of the trimmer head 1 directly, or via a transmission. The trimmer head 1 comprises a trimmer line 3 configured to cut vegetation, such as grass, upon rotation of the trimmer head 1. The trimmer 13 may comprise one or more buttons 12, such as a speed control, a throttle control and/or start button, adjacent to, or on, the at least one handle 8, 8'. The at the at least one handle 8, 8' may further comprise a dead-man's-hand switch 14 to be depressed by a user's hand when holding the handle 8, 8'.

Figure 2:
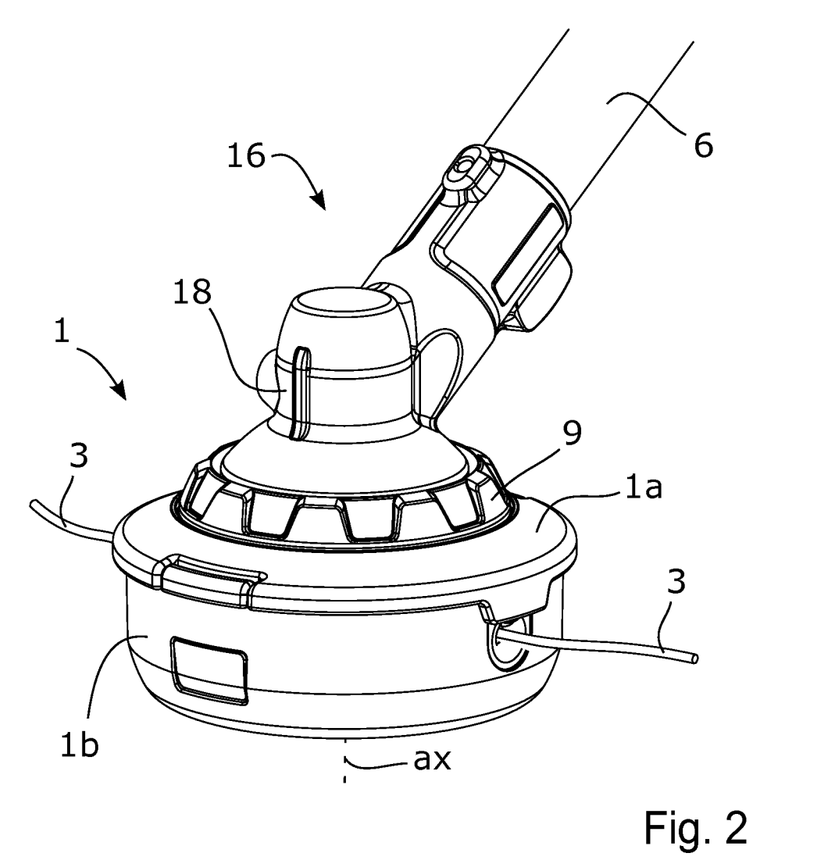
FIG. 2 illustrates a trimmer head portion of the trimmer illustrated in FIG. 1.

FIG. 2 illustrates a trimmer head portion 16 of the trimmer 13 illustrated in FIG. 1. FIG. 2 further illustrates a trimmer head 1 according to some embodiments, mounted onto the trimmer head portion 16. The trimmer head 1 is arranged to be driven around a rotational axis ax to rotate a trimmer line 3 extending radially from the trimmer head 1. According to the illustrated embodiments, the trimmer head 1 comprises two trimmer lines 3 extending radially from the trimmer head 1. According to further embodiments, the trimmer head 1 may comprise another number of trimmer lines 3, such as one, three or four trimmer lines 3. The trimmer head portion 16 of the trimmer comprises a trimmer head shaft extending from the trimmer head portion 16 in the direction of the rotational axis ax. The trimmer head shaft is not visible in FIG. 2. The trimmer head portion 16 further comprises a transmission 18 arranged to transfer rotation from a shaft in the pole 6 to the trimmer head shaft.

Figure 3:
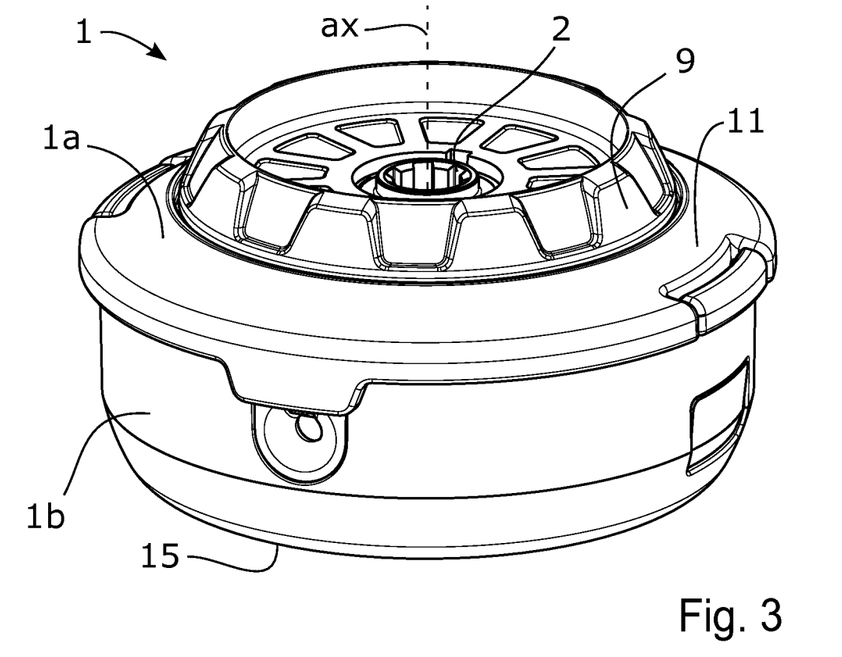
FIG. 3 illustrates a trimmer head according to embodiments illustrated in FIG. 2.

FIG. 3 illustrates the trimmer head 1, according to the embodiments illustrated in FIG. 2. The trimmer head 1 comprises an interface 2 for connecting the trimmer head 1 to a trimmer head shaft of a trimmer. According to the illustrated embodiments, the interface 2 comprises a splined drive shaft interface comprising radially inwardly arranged splines. The trimmer head shaft, referred to with reference to FIG. 2, comprises matching radially outwardly arranged splines. The trimmer head shaft is thus configured to extend into the interface 2 of the trimmer head 1. According to further embodiments, the trimmer head 1 may comprise another type of interface 2 than a splined drive shaft interface, for example a threaded interface. The trimmer head 1 further comprises a housing 1a, 1d. The housing 1a, 1d according to the illustrated embodiments comprises an upper housing 1a and a lower housing 1b. The upper housing 1a forms part of a first portion 11 of the trimmer head 1 configured to face a trimmer, when the trimmer head 1 is mounted onto the trimmer. The lower housing 1b forms art of a second portion 15 of the trimmer head 1 configured to face away from the trimmer, when the trimmer head 1 is mounted onto the trimmer. Accordingly, the first portion 11 may be referred to as the top side of the trimmer head 1, and the second portion 15 may be referred to as the underside of the trimmer head 1.

Figure 4:
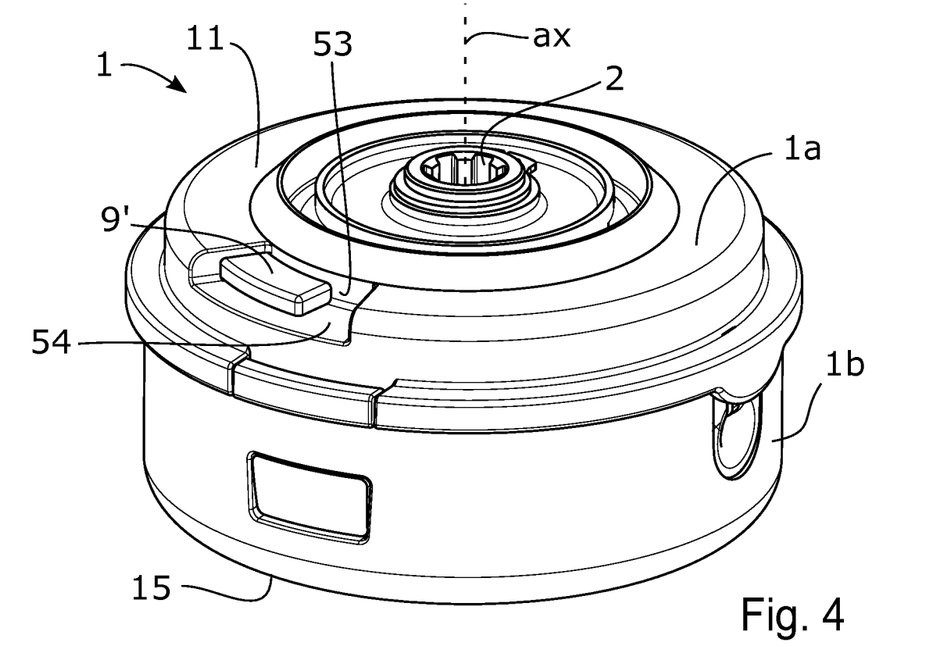
FIG. 4 illustrates a trimmer head according to some further embodiments.

FIG. 4 illustrates a trimmer head 1, according to some further embodiments. The trimmer head 1 according to these embodiments comprises an interface 2, and a housing 1a, 1b, in accordance with the embodiments explained with reference to FIG. 3.

Figure 5:
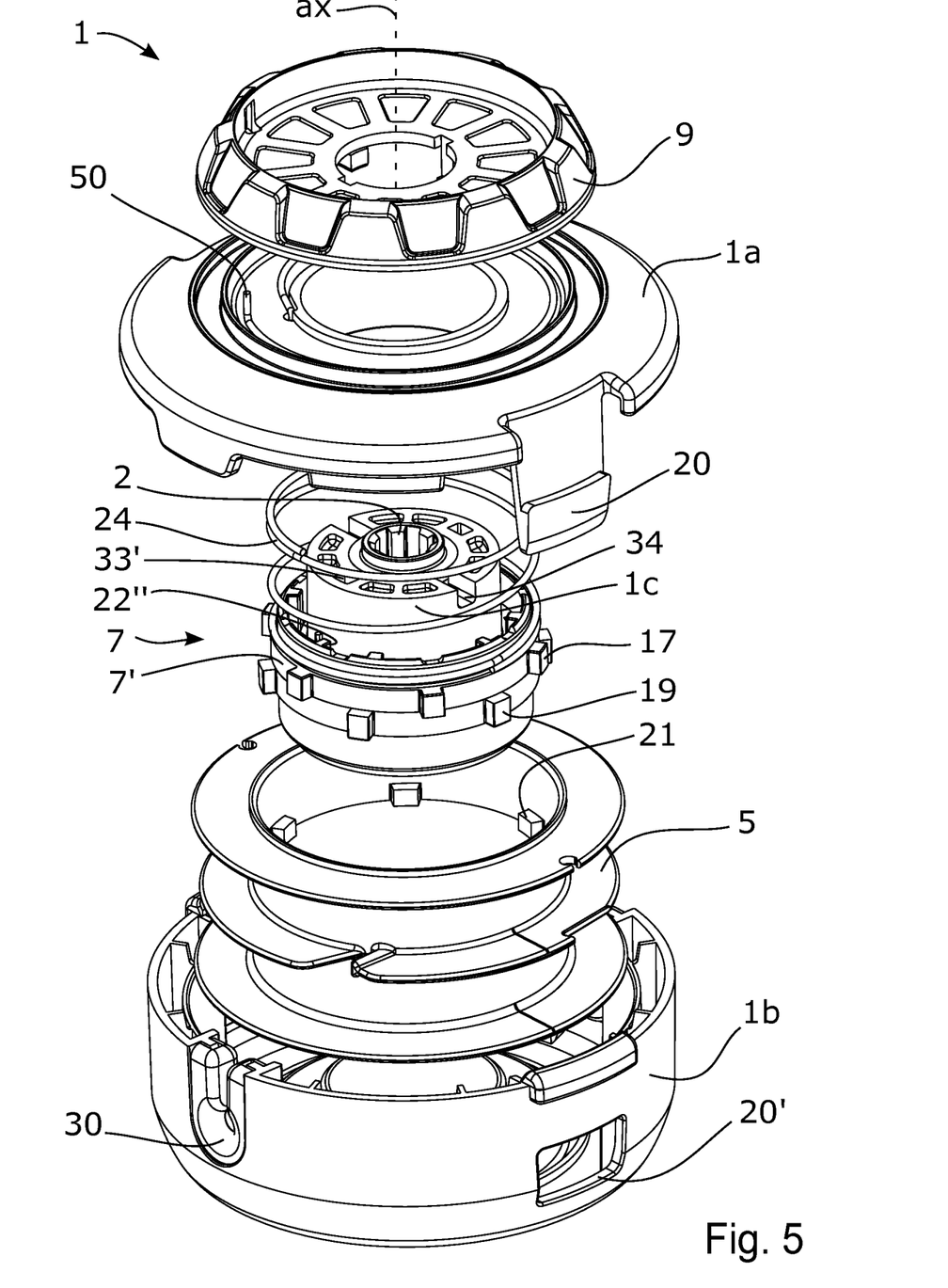
FIG. 5 illustrates an exploded view of the trimmer head according to the embodiments illustrated in FIG. 1, FIG. 2, and FIG. 3.

FIG. 5 illustrates an exploded view of the trimmer head 1 according to the embodiments illustrated in FIG. 1, FIG. 2, and FIG. 3. In FIG. 5, the upper housing 1a and the lower housing 1b are separated. As can be seen, the housing 1a, 1b is arranged to accommodate a trimmer line spool 5. The trimmer line spool 5 is configured to accommodate trimmer line spooled around the trimmer line spool 5. According to the illustrated embodiments, the upper housing 1a comprises a snap arrangement 20 configured to fit into an opening 20' in the lower housing 1b, when the trimmer head 1 is in an assembled state, as illustrated in FIG. 3. In this manner, the upper housing 1a is attached to the lower housing 1b when the trimmer head 1 is in the assembled state. The trimmer head 1 further comprises an automatic feed mechanism 7. The automatic feed mechanism 7 is configured to release a trimmer line, spooled around the trimmer line spool 5, when the trimmer head 1 is subjected to a change in rotational speed, via the interface 2, at a higher rate than a threshold rate of change in rotational speed. Accordingly, when the trimmer head 1 is subjected to an acceleration or deceleration, by a trimmer drive shaft via the interface 2, at a higher rate than the threshold rate, the automatic feed mechanism 7 will release a trimmer line spooled around the trimmer line spool 5. The functions and features of the automatic feed mechanism 7 will be explained in detail herein. The trimmer head 1 further comprises an actuator 9 connected to the automatic feed mechanism 7 such that a manual actuation of the actuator 9 releases the trimmer line spooled around the trimmer line spool 5. Thereby, a user can perform a manual feed of the trimmer head 1, without having to dissemble the trimmer head 1.

According to the illustrated embodiments, the trimmer head 1 comprises an inner body 1c operably connected to the trimmer line spool 5 via the automatic feed mechanism 7. As can be seen in FIG. 5, the interface 2, i.e. the drive shaft interface 2, is arranged at the inner body 1c and is rotationally locked thereto. The inner body 1c is movable relative the housing 1a, 1b. The inner body 1c is configured to move relative the housing 1a, 1b when the trimmer head 1 is subjected to the change in rotational speed, via the interface 2, at a higher rate than the threshold rate of change in rotational speed. The automatic feed mechanism 7 is configured to release a trimmer line spooled around the trimmer line spool 5 when the inner body 1c moves, i.e. rotates, relative the housing 1a, 1b.

According to the illustrated embodiments, the automatic feed mechanism 7 comprises a mechanism body 7' operably connected to the housing 1a, 1b and to the inner body 1c.

Figure 6:
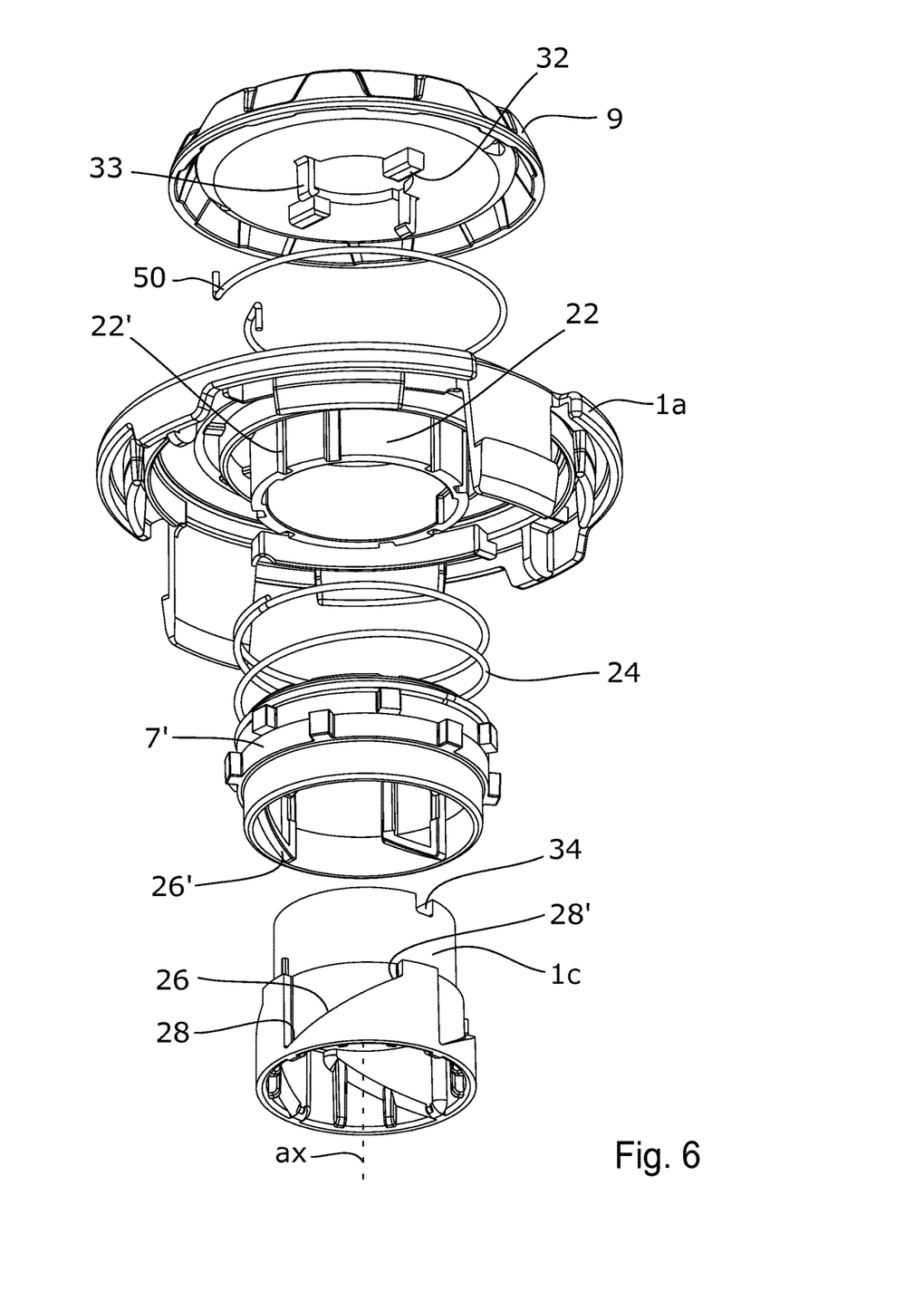
FIG. 6 illustrates a second exploded view of some components of the trimmer head illustrated in FIG. 5.

FIG. 6 illustrates a second exploded view of some components of the trimmer head 1 illustrated in FIG. 5. As can be seen in FIG. 6, the upper housing 1a comprises a portion 22 provided with splines 22' extending in the same direction as the rotational axis ax of the trimmer head 1. As best seen in FIG. 5, the mechanism body 7' comprises elongated protrusions 22" extending in the same direction as the rotational axis ax of the trimmer head 1. The elongated protrusions 22" of the mechanism body 7' are configured to extend into the splines 22' of the upper housing 1a, when the trimmer head 1 is in an assembled state. Thus, due to these features, the mechanism body 7' is rotationally locked to the housing 1a, 1b, when the trimmer head is in the assembled state. The elongated protrusions 22" of the mechanism body 7' can slide relative the splines 22' of the upper housing 1a. Accordingly, the mechanism body 7' is movable in the direction of the rotational axis ax, when the trimmer head 1 is in the assembled state. Further, as can be seen in FIG. 5 and FIG. 6, according to the illustrated embodiments, the trimmer head 1 comprises a spring 24 configured to apply a force onto the mechanism body 7' in a direction from the upper housing 1a towards the lower housing 1b. As best seen in FIG. 6, the inner body 1c comprises pitch surfaces 26 and the mechanism body 7' comprises abutment surfaces 26'. The abutment surfaces 26' are configured to abut against the pitch surfaces 26, when the trimmer head 1 is in the assembled state. Since the abutment surfaces 26' abut against the pitch surfaces 26, the inner body 1c will displace the mechanism body 7' in the direction of the rotational axis ax towards the upper housing 1a, when the inner body 1c rotates relative the housing 1a, 1b. Upon the displacement, the spring 24 is compressed.

As indicated in FIG. 5, the mechanism body 7' comprises a set of first stops 17 and a set of second stops 19. According to the illustrated embodiments, the first and second stops 17, 19 protrudes in an outwardly radial direction of the mechanism body 7'. Further, the trimmer line spool 5 is provided with a set of stops 21 protruding in an inwardly radial direction of the trimmer line spool 5. The first and second stops 17, 19 of the mechanism body 7' are configured to cooperate with the stops 21 of the trimmer line spool 5. When the automatic feed mechanism 7 is in an unactuated state, the spring 24 forces the mechanism body 7' to be in a first position towards the lower housing 1b. In the first position, the abutment surfaces 26', illustrated in FIG. 6, are at lower portions 28 of the pitch surfaces 26. The trimmer line spool 5 is prevented from rotating relative the housing 1a, 1b, when the mechanism body 7' is in the first position, by abutment between the set of first stops 17 and the stops 21 of the trimmer line spool 5, indicated in FIG. 5. The second stops 19 are arranged a distance from the first stops 17 in a direction of the rotational axis ax. When the automatic feed mechanism 7 transitions from the unactuated state to an actuated state, for example when the inner body 1c moves, i.e. rotates, relative the housing 1a, 1b, the pitch surfaces 26 displaces the mechanism body 7' towards a second position, in a direction from the lower housing 1b towards the upper housing 1a. In the second position, the abutment surfaces 26', illustrated in FIG. 6, are at upper portions 28' of the pitch surfaces 26. The trimmer line spool 5 is prevented from rotating relative the housing 1a, 1b, when the mechanism body 7' is in the second position, by abutment between the set of second stops 19 and the stops 21 of the trimmer line spool 5, indicated in FIG. 5. Further, as can be seen in FIG. 5, the second stops 19 are circumferentially displaced relative the first stops 17 around the rotational axis ax.

Accordingly, when the inner body 1c moves relative the housing 1a, 1b and displaces the mechanism body 7' from the first position towards the second position, the trimmer line spool 5 can rotate a predetermined angle relative the housing 1a, 1b. Thus, according to the illustrated embodiments, the automatic feed mechanism 7 is configured to release the trimmer line 3 by allowing the trimmer line spool 5 to rotate a predetermined angle relative the housing 1a, 1b. The predetermined angle is determined by the circumferential distances between the first and second stops 17, 19. According to the illustrated embodiments, the predetermined angle is approximately 30 degrees.

When the automatic feed mechanism 7 transitions from the actuated state to the unactuated state, the spring 24 displaces the mechanism body 7' to the first position. In the first position, the trimmer line spool 5 is prevented from rotating relative the housing 1a, 1b by abutment between first stops 17 and the stops 21 of the trimmer line spool 5. Since the first stops 17 are circumferentially displaced relative the second stops 19 around the rotational axis ax, the trimmer line spool 5 is allowed to rotate an angle relative the housing 1a, 1b when the automatic feed mechanism 7 transitions from the actuated state to the unactuated state.

Thus, in a sequence where the automatic feed mechanism 7 transitions from the unactuated state to the actuated state and back to the unactuated state, a stop 21 of the trimmer line spool will abut against an initial first stop 17, a second stop 19 and then an adjacent first stop 17 arranged at a different a circumferential position around the rotational axis ax than the initial first stop 17. According to the illustrated embodiments, abutment surfaces of two adjacent first stops 17 are arranged at approximately 60 degrees from each other around the rotational axis ax. Thus, in a sequence where the automatic feed mechanism 7 transitions from the unactuated state to the actuated state and back to the unactuated state, the trimmer line spool 5 is allowed to rotate approximately 60 degrees around the rotational axis ax.

As indicated in FIG. 5, the lower housing 1b is provided with an opening 30, through which a trimmer line will extend during use of the trimmer head 1. During operation, centrifugal forces acting on the trimmer line pull the trimmer line through the openings 30. Thus, trimmer line will be fed when the trimmer line spool 5 rotates relative the housing 1a, 1b. The centrifugal forces acting on the trimmer line may cause the trimmer line spool 5 to rotate relative the housing 1a, 1b when the automatic feed mechanism 7 allows such rotation.

As mentioned, the trimmer head 1 further comprises an actuator 9. According to the illustrated embodiments, the actuator 9 is disc-shaped and extends along a full turn around the rotational axis ax. As indicated in FIG. 6, the actuator 9 comprises protrusions 32. The protrusions 32 of the actuator 9 are configured to extend into notches 34 in an upper portion of the inner body 1c. The notches 34 in the upper portion of the inner body 1c are also seen and indicated in FIG. 5. Further, as indicated in FIG. 6, the actuator 9 comprises a snap arrangement 33. The snap arrangement 33 is configured to extend into openings 33' of the inner body 1c, indicated in FIG. 5, to attach the actuator 9 to the inner body 1c. Thus, according to the illustrated embodiments, the actuator 9 is operably connected to the inner body 1c by being rotationally locked to the inner body 1c. The actuator 9 is configured to be manually actuated by being pushed or turned an angle around the rotational axis ax. The actuator 9 is operably connected to the mechanism body 7', in the sense that a manual actuation of the actuator 9 displaces the mechanism body 7'. The following will be explained with simultaneous reference to FIG. 2, FIG. 5, and FIG. 6. If a user wants to perform a manual feed of trimmer line 3, the user may simply grab the housing 1a, 1b, and move the actuator 9 relative the housing 1a, 1b. Obviously, the user may also perform a manual feed of trimmer line 3 by moving the housing 1a, 1b relative the actuator 9. As a result thereof, the inner body 1c will move, i.e. rotate, relative the housing 1a, 1b, and the inner body 1c will thereby displace the mechanism body 7' from the first position to the second position in a direction of the rotational axis ax. As a result, the trimmer line 3 spooled around the trimmer line spool 5 is released, since the trimmer line spool 5 is free to rotate the predetermined angle relative the housing 1a, 1b. The user may then pull the trimmer line 3 to perform a feed thereof. When the user releases the actuator 9, the spring 24 displaces the mechanism body 7' from the second position to the first position in a direction of the rotational axis ax, and the trimmer line spool 5 is free to rotate an angle relative the housing 1a, 1b. The user may thus pull the trimmer line 3 to perform further feed of trimmer line 3, after releasing the actuator 9. If the user wants to feed more trimmer line 3, the user may perform several actuation movements of the actuator 9, relative the housing 1a, 1b, while pulling the trimmer line 3.

As indicated in FIG. 5 and FIG. 6, the trimmer head 1 comprises a spring 50, e.g. a torsion spring, arranged between the upper housing 1a and the actuator 9. The spring 50 is configured to counteract relative movement between the actuator 9 and the housing 1a, 1b. Since the actuator 9 is rotationally locked to the inner body 1c, the spring 50 will also counteract relative movement between the inner body 1c and the housing 1a, 1b. The actuator 9 is displaceable between a first position, in which the automatic feed mechanism 7 locks the trimmer line 3, and a second position in which the automatic feed mechanism 7 releases the trimmer line 3 by allowing rotation of the trimmer line spool 5 relative the housing 1a, 1b. Accordingly, the actuator 9 is biased towards the first position by the spring 50. Thus, according to the illustrated embodiments, relative movement between the inner body 1c and the housing 1a, 1b is counteracted by the spring 50, as well as by the spring 24 applying a force onto the mechanism body 7' towards the first position.

Spring coefficients of the springs 24, 50 affect the threshold rate of change in rotational speed, i.e. affects the rate of change in rotational speed required for obtaining a relative movement between the inner body 1c and the housing 1a, 1b. Further, the mass and inertia of components of the trimmer head 1, such as the inner body 1c, the housing 1a, 1b, the trimmer line spool 5, and the automatic feed mechanism 7, also affect the threshold rate of change in rotational speed, as well as frictional forces between the components. These factors and aspects may be chosen to obtain a wanted threshold rate of change in rotational speed. According to some embodiments, the threshold rate of change in rotational speed is set to a rate higher than what is obtained during normal operation of a trimmer. According to such embodiments, the automatic feed mechanism 7 will perform a release of trimmer line when the trimmer head 1 is subjected to a rate of change in rotational speed, via the interface 2, at a higher rate than what is obtained during normal operation of a trimmer. The trimmer 13 illustrated in FIG. 1, may be configured to initiate a feed of trimmer line 3 by accelerating, or decelerating, the trimmer head 1 at a higher rate than during normal operation. A deceleration of the trimmer head 1 may be obtained by braking the trimmer head, for example by braking the power source 4, or reversing the power of the power source 4. The trimmer 13 may comprise an interface component, such as a button, via which a user can control the trimmer 13 to initiate a feed of trimmer line 3 by accelerating, or decelerating, the trimmer head 1 at a higher rate than the threshold rate. As an alternative, or in addition, the trimmer 13 may comprise a sensor configured to detect a length of the trimmer line 3, wherein the trimmer 13 is configured to initiate feed of trimmer line 3 when the length is below a threshold value.

When the trimmer head 1 is mounted onto a trimmer, as is illustrated in FIG. 2, a first portion 11 of the trimmer head 1 face the trimmer, and a second portion 15 of the trimmer head 1 face away from the trimmer. Accordingly, when the trimmer head 1 is held horizontally over a ground surface during operation of the trimmer, the second portion 15 of the trimmer head 1 that faces away from the trimmer will face the ground surface, and the first portion 11 of the trimmer head 1 that faces the trimmer will face away from the ground surface. According to the illustrated embodiments, the actuator 9 is arranged at the first portion 11. Thereby, the actuator 9 is protected from dust, dirt, and vegetation residues. Further the actuator 9 is protected from damages by objects on a ground surface. Further, the risk of an unintended actuation of the actuator 9 is lowered. In addition, according to the embodiments illustrated in FIG. 1, FIG. 2, FIG. 3, FIG. 5, and FIG. 6, the actuator 9 is disc-shaped and extends along a full turn around the rotational axis ax, which further protects the actuator 9 from becoming clogged by dust, dirt, and vegetation residues. In addition, according to the embodiments illustrated in FIG. 1, FIG. 2, FIG. 3, FIG. 5, and FIG. 6, many components of the trimmer head 1 are rotation symmetrical, with a centre axis coinciding with the rotational axis ax of the trimmer head 1, such as the actuator 9, the inner body 1c, the mechanism body 7', and the trimmer line spool 5. Thereby, a balanced trimmer head 1 can easily be provided, which causes a low amount of vibrations during use. Further, according to these embodiments, the mechanism body 7' is sleeve-shaped which also provides conditions for a balanced trimmer head 1.

Figure 7:
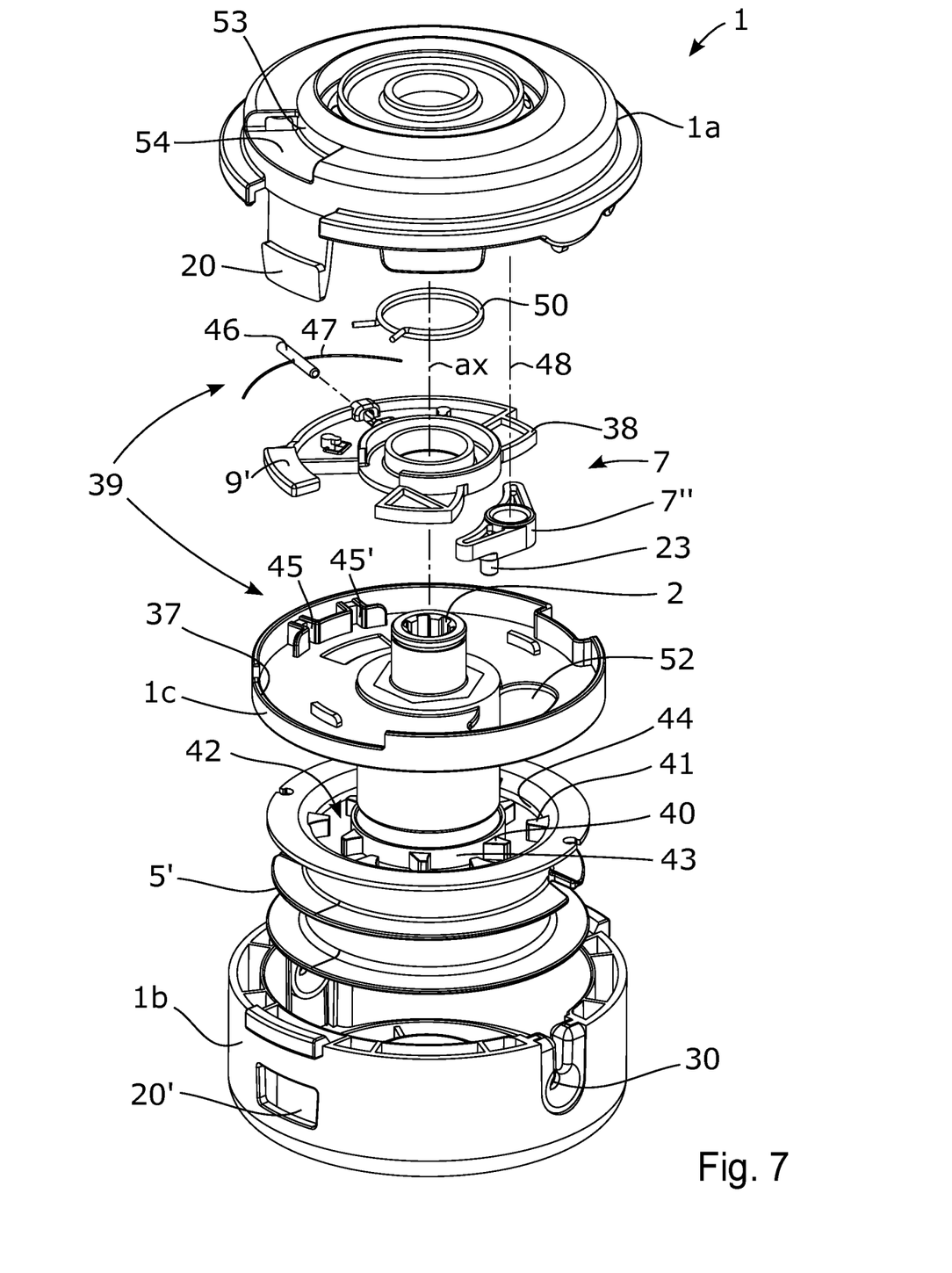
FIG. 7 illustrates an exploded view of the trimmer head according to the embodiments illustrated in FIG. 4.

FIG. 7 illustrates an exploded view of the trimmer head 1 according to the embodiments illustrated in FIG. 4. In FIG. 7, the upper housing 1a and the lower housing 1b are separated. As can be seen, the housing 1a, 1b is arranged to accommodate a trimmer line spool 5'. The trimmer line spool 5' is configured to accommodate trimmer line spooled around the trimmer line spool 5'. According to the illustrated embodiments, the upper housing 1a comprises a snap arrangement 20 configured to fit into an opening 20' in the lower housing 1b, when the trimmer head 1 is in an assembled state, as illustrated in FIG. 4. In this manner, the upper housing 1a is attached to the lower housing 1b when the trimmer head 1 is in the assembled state. The trimmer head 1 further comprises an automatic feed mechanism 7. The automatic feed mechanism 7 is configured to release a trimmer line, spooled around the trimmer line spool 5', when the trimmer head 1 is subjected to a change in rotational speed, via the interface 2, at a higher rate than a threshold rate of change in rotational speed. Accordingly, when the trimmer head 1 is subjected to an acceleration or deceleration, by a trimmer drive shaft via the interface 2, at a higher rate than the threshold rate, the automatic feed mechanism 7 will release a trimmer line spooled around the trimmer line spool 5'. The functions and features of the automatic feed mechanism 7 will be explained in detail herein. The trimmer head 1 further comprises an actuator 9' connected to the automatic feed mechanism 7 such that a manual actuation of the actuator 9' releases the trimmer line spooled around the trimmer line spool 5'. Thereby, a user can perform a manual feed of the trimmer head 1, without having to dissemble the trimmer head 1.

According to the illustrated embodiments, the trimmer head 1 comprises an inner body 1c operably connected to the trimmer line spool 5' via the automatic feed mechanism 7. As can be seen in FIG. 7, the interface 2, i.e. the drive shaft interface 2, is arranged at the inner body 1c and is rotationally locked thereto. The inner body 1c is movable relative the housing 1a, 1b. According to the illustrated embodiments, the inner body 1c is disc-shaped and comprises at least one cleat 37. A stop arranged at the upper housing 1a extends into the at least one cleat 37 and thereby limits relative movement between the inner body 1c and the housing 1a, 1b to a certain angle, such as 20-35 degrees, or approximately 25 degrees. The inner body 1c is configured to move relative the housing 1a, 1b when the trimmer head 1 is subjected to the change in rotational speed, via the interface 2, at a higher rate than the threshold rate of change in rotational speed. The automatic feed mechanism 7 is configured to release a trimmer line spooled around the trimmer line spool 5' when the inner body 1c moves, i.e. rotates, relative the housing 1a, 1b.

According to the illustrated embodiments, the automatic feed mechanism 7 comprises a mechanism body 7" operably connected to the housing 1a, 1b and to the inner body 1c. According to the embodiments illustrated in FIG. 7, the mechanism body 7" comprises a locking lever 23. The trimmer head 1 further comprises a spring holding member 38 and a spring 50, such as a torsion spring. The spring 50 is connected to the upper housing 1a and to the spring holding member 38. The spring 50 is configured to counteract relative movement between the spring holding member 38 and the housing 1a, 1b. The trimmer head 1 further comprises a centrifugal clutch 39 configured to lock the spring holding member 38 to the inner body 1c when the trimmer head 1 rotates at a rotational speed above a threshold rotational speed. The threshold rotational speed may for example be within the range 500-1000 rpm. According to the illustrated embodiments, the centrifugal clutch 39 comprises a centrifugal locking device 46 arranged at the spring holding member 38, and two notches 45, 45' each arranged at a different circumferential position at the inner body 1c. The centrifugal locking device 46, which according to the illustrated embodiments is formed as a pin, is biased by a spring 47 in a radial direction towards the rotational axis ax of the trimmer head 1. When the trimmer head 1 rotates at a rotational speed above the threshold rotational speed, the centrifugal force, acting on the centrifugal locking device 46, overcomes the biasing force of the spring 47. As a result thereof, the centrifugal locking device 46 is displaced into one of the two notches 45, 45', and the spring holding member 38 is, as a result thereof, rotationally locked to the inner body 1c. Which one of the two notches 45, 45' the centrifugal locking device 46 will be displaced into, depends on the rotational direction of the trimmer head 1, as will be further explained herein. When the spring holding member 38 is rotationally locked to the inner body 1c, the spring holding member 38 will move relative the housing 1a, 1b, when the inner body 1c moves relative the housing 1a, 1b. Further, when the spring holding member 38 is rotationally locked to the inner body 1c, the spring 50 will counteract relative movement between the inner body 1c and the housing 1a, 1b.

Figure 8:
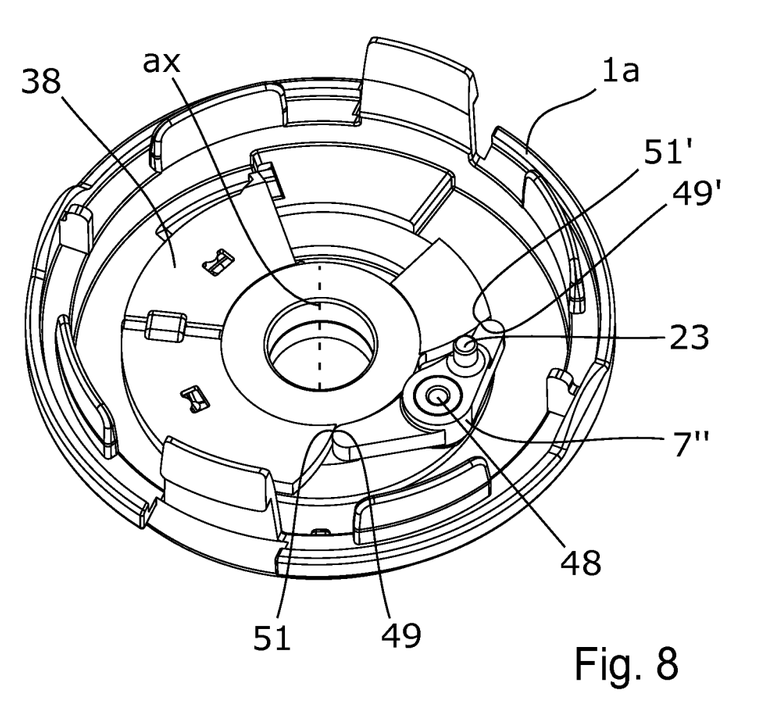
FIG. 8 illustrates an upper housing, a mechanism body and a spring holding member of the trimmer head illustrated in FIG. 7.

FIG. 8 illustrates the upper housing 1a, the mechanism body 7" and the spring holding member 38 of the trimmer head 1 illustrated in FIG. 7, in an assembled state. As can be seen in FIG. 8, the mechanism body 7" is journaled to the upper housing 1a in a pivot axis 48. The pivot axis 48 is also indicated in FIG. 7. The mechanism body 7" comprises a first abutment surface 49 configured to abut against a first abutment surface 51 of the spring holding member 38, and a second abutment surface 49' configured to abut against a second abutment surface 51' of the spring holding member 38. The locking lever 23 of the mechanism body 7" is arranged at a distance from the pivot axis 48 of the mechanism body 7". Further, the mechanism body 7" and the first and second abutment surfaces 49, 51, 49', 51' are arranged such that radial position of the locking lever 23, relative the rotational axis ax of the trimmer head, depends on the relative rotational position between the upper housing 1a and the spring holding member 38. According to the illustrated embodiments, the mechanism body 7" and the first and second abutment surfaces 49, 51, 49', 51' are arranged such that the locking lever 23 is displaced from a first radial position relative the rotational axis ax, to a second radial position relative the rotational axis ax, when the spring holding member 38 moves relative the upper housing 1a.

The following will be explained with reference to FIG. 7. The locking lever 23 of the mechanism body 7" is configured to extend through an opening 52 in the inner body 1c, when the trimmer head 1 is in the assembled state. The trimmer line spool 5' comprises a recess 42. The locking lever 23 is configured to extend into the recess 42, when the trimmer head 1 is in the assembled state. The recess 42 is provided with at set of radially protruding inner stops 40 on its inner circumferential wall 43, and a set of radially protruding outer stops 41 on its outer circumferential wall 44. The locking lever 23 is configured to cooperate with the set of radially protruding inner stops 40 and the set of radially protruding outer stops 41. When the locking lever 23 is in the first radial position, towards the inner circumferential wall 43 of the recess 42, the trimmer line spool 5' is prevented from rotating by abutment between the locking lever 23 and radially protruding inner stops 40. When the locking lever 23 is in the second radial position, towards the outer circumferential wall 44 of the recess 42, the trimmer line spool 5' is prevented from rotating by abutment between the locking lever 23 and radially protruding outer stops 41. As can be seen in FIG. 7, the radially protruding outer stops 41 are circumferentially displaced relative the radially protruding inner stops 40. Thus, when the locking lever 23 moves from the first radial position, to the second radial position, the trimmer line spool 5' is free to rotate a predetermined angle relative the housing 1a, 1b. The predetermined angle is determined by the circumferential distances between the radially protruding inner stops 40 and the radially protruding outer stops 41. According to the illustrated embodiments, the predetermined angle is approximately 30 degrees.

When the locking lever 23 moves from the second radial position to the first radial position, the trimmer line spool 5' is prevented from rotating by abutment between the locking lever 23 and radially protruding inner stops 40. Since the radially protruding inner stops 40 are circumferentially displaced relative the radially protruding outer stops 41, the trimmer line spool 5' is free to rotate an angle relative the housing 1a, 1b when the locking lever 23 moves from the second radial position to the first radial position. According to the illustrated embodiments, abutment surfaces of two adjacent radially protruding inner stops 40 are arranged approximately 60 degrees from each other around the rotational axis ax. Thus, in a sequence where the locking lever 23 moves from the first radial position to the second radial position and back to the first radial position, the trimmer line spool 5' is allowed to rotate approximately 60 degrees around the rotational axis ax.

As indicated in FIG. 7, the lower housing 1b is provided with an opening 30, through which trimmer line will extend during use of the trimmer head. During operation, centrifugal forces acting on the trimmer line will pull the trimmer line through the opening 30. Thus, trimmer line will be fed when the trimmer line spool 5' rotates relative the housing 1a, 1b. The centrifugal forces acting on the trimmer line may cause the trimmer line spool 5' to rotate relative the housing 1a, 1b when the automatic feed mechanism 7 allows such rotation.

To summarize, if the trimmer head 1 is driven to rotate around the rotational axis ax at a rotational speed above the threshold rotational speed, the centrifugal clutch 39 locks the spring holding member 38 to the inner body 1c. If the trimmer head 1 is subjected to a change in rotational speed, via the interface 2, at a higher rate than the threshold rate, for example an abrupt deceleration, the inner body 1c and the spring holding member 38 will rotate relative the housing 1a, 1b. As a result, the locking lever 23 moves from the first radial position to the second radial position, and the trimmer line spool 5' is free to rotate. If the trimmer head 1 is rotating at a rotational speed below the threshold rotational speed, and trimmer head 1 is subjected to a change in rotational speed via the interface 2 at a higher rate than the threshold rate, no trimmer line will be fed because the inner body 1c is free to rotate relative the spring holding member 38. Thus, due to the centrifugal clutch 39, the automatic feed mechanism 7 will release the trimmer line when the trimmer head 1 rotates at rotational speed above the threshold rotational speed and when the trimmer head 1 is subjected to a change in rotational speed, via the interface 2, at a higher rate than the threshold rate. Thereby, an unintended release of trimmer line can be avoided at lower rotational speeds.

As mentioned, the trimmer head 1 comprises an actuator 9'. According to these embodiments, the actuator 9 is connected to the spring holding member 38. The actuator 9' extends through an opening 53 in the upper housing 1a, when the trimmer head 1 is in the assembled state, as is illustrated in FIG. 4. The actuator 9 is configured to be manually actuated by being pushed or turned an angle around the rotational axis ax relative the housing 1a, 1b. When the trimmer head 1 is at standstill, or is rotating at a rotational speed below the threshold rotational speed, the spring holding member 38 is free to rotate relative the inner body 1c. Accordingly, when the actuator 9' is manually actuated by being pushed or turned an angle around the rotational axis ax relative the housing 1a, 1b, the spring holding member 38 will move a distance around the rotational axis ax relative the housing 1a, 1b. As a result, the locking lever 23 moves from the first radial position to the second radial position, and the trimmer line spool 5' will be free to rotate the predetermined angle. Thus, according to the illustrated embodiments, the actuator 9' is operably connected to the locking lever 23, via the spring holding member 38. When the spring holding member 38 moves around the rotational axis ax relative the housing 1a, 1b, the spring 50 is compressed. After manually actuating the actuator 9', a user may grab trimmer line extending through the openings 30 to pull out trimmer line. When releasing the actuator 9', the actuator 9' will return to a neutral, unactuated position, by the spring 50, and the trimmer line spool 5' is free to rotate an angle relative the housing 1a, 1b as a result thereof. The user may thus pull the trimmer line to perform further feed of trimmer line, after releasing the actuator 9'. If the user wants to feed more trimmer line, the user may simply perform several actuation movements of the actuator 9' while pulling the trimmer line.

As can be seen in FIG. 4 and FIG. 7, the actuator 9' is arranged at a distance from the rotational axis ax. Further, the actuator 9' is arranged in a recess 54 of the upper housing 1a. As a result, the actuator 9' is protected from damages, and is protected from dirt, grease, vegetation residues, and the like. Further, the risk of an unintended actuation of the actuator 9 is lowered. When the trimmer head 1 is mounted onto a trimmer, a first portion 11 of the trimmer head 1 face the trimmer, and a second portion 15 of the trimmer head 1 face away from the trimmer. Accordingly, when the trimmer head 1 is held horizontally over a ground surface during operation of the trimmer, the second portion 15 of the trimmer head 1, that faces away from the trimmer, will face the ground surface, and the first portion 11 of the trimmer head 1, that faces the trimmer, will face away from the ground surface. According to the illustrated embodiments, the actuator 9' is arranged at the first portion 11. Thereby, the actuator 9' is protected from dust, dirt, and vegetation residues. Further the actuator 9' is protected from damages by objects on a ground surface. Further, the risk of an unintended actuation of the actuator 9' is lowered.

The trimmer head 1 according to the embodiments illustrated in FIG. 4 and FIG. 7 is configured to be able to operate in two different rotational directions. That is, when the trimmer head 1 is rotating at a rotational speed above the threshold rotational speed in a first rotational direction, the centrifugal locking device 46 is displaced into a first notch 45, of the two notches 45, 45'. When the trimmer head 1 is rotating at a rotational speed above the threshold rotational speed in a second rotational direction, opposite to the first rotational direction, the centrifugal locking device 46 is displaced into a second notch 45', of the two notches 45, 45'. In this manner, a relative movement between the inner body 1c and the housing 1a, 1b can be transferred to a movement of the locking lever 23 from the first position to the second position, regardless of the rotational direction of the trimmer head 1. Thus, the automatic feed mechanism 7 is capable of releasing the trimmer line regardless of the rotational direction of the trimmer head 1. As a result, a versatile trimmer head 1 is provided.

A spring coefficient of the spring 50 affects the threshold rate of change in rotational speed, i.e. affects the rate of change in rotational speed required for obtaining a relative movement between the inner body 1c and the housing 1a, 1b. Further, the mass and inertia of components of the trimmer head 1, such as the inner body 1c, the housing 1a, 1b, the trimmer line spool 5', and the automatic feed mechanism 7, also affect the threshold rate of change in rotational speed, as well as frictional forces between the components. These factors and aspects may be chosen to obtain a wanted threshold rate of change in rotational speed. According to some embodiments, the threshold rate of change in rotational speed is set to a rate higher than what is obtained during normal operation of a trimmer. According to such embodiments, the automatic feed mechanism 7 will perform a release of trimmer line when the trimmer head 1 is subjected to a rate of change in rotational speed, via the interface 2, at a higher rate than what is obtained during normal operation of a trimmer. A trimmer comprising a trimmer head 1 according to the embodiments illustrated in FIG. 4 and FIG. 7, may be configured to initiate a feed of trimmer line by rotating the trimmer head 1 at a rotational speed higher than the threshold rotational speed, and accelerating, or decelerating, the trimmer head 1 at a higher rate than during normal operation. A deceleration of the trimmer head 1 may be obtained by braking the trimmer head, for example by braking the power source, or reversing the power of the power source of the trimmer. Such a trimmer may comprise an interface component, such as a button, via which a user can control the trimmer to initiate a feed of trimmer line by accelerating, or decelerating, the trimmer head 1 at a higher rate than the threshold rate. As an alternative, or in addition, the trimmer may comprise a sensor configured to detect a length of trimmer line, wherein the trimmer is configured to initiate feed of trimmer line when the length is below a threshold value.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the present invention, as defined by the appended claims. The trimmer 13, as referred to herein may also be referred to as a string trimmer, a weed-whip, a whipper-snipper, a weed-whacker, a line trimmer, a rotary cutting tool, or a strimmer.

As used herein, the term "comprising" or "comprises" is open-ended, and includes one or more stated features, elements, steps, components or functions but does not preclude the presence or addition of one or more other features, elements, steps, components, functions or groups thereof.

The invention claimed is:

1. A trimmer head arranged to be driven around a rotational axis, via an interface, to rotate a trimmer line, wherein the trimmer head comprises:
a housing,
the interface,
a trimmer line spool, and
an automatic feed mechanism,
wherein the automatic feed mechanism is configured to release the trimmer line spooled around the trimmer line spool when the trimmer head is subjected to a change in a rotational speed, via the interface, at a higher rate than a threshold rate of the change in the rotational speed,
wherein the trimmer head further comprises an actuator connected to the automatic feed mechanism such that a manual actuation of the actuator releases the trimmer line spooled around the trimmer line spool, and
wherein the actuator is displaceable between a first position, in which the automatic feed mechanism locks the trimmer line, and a second position in which the automatic feed mechanism releases the trimmer line, and wherein the actuator is biased towards the first position.

2. The trimmer head according to claim 1, wherein the automatic feed mechanism is configured to release the trimmer line by allowing the trimmer line spool to rotate relative to the housing.

3. The trimmer head according to claim 2, wherein the automatic feed mechanism is configured to allow the trimmer line spool to rotate a predetermined angle relative to the housing.

4. The trimmer head according to claim 1, wherein the actuator is configured to be manually actuated by being pushed or turned at an angle around the rotational axis.

5. The trimmer head according to claim 1, wherein the trimmer head comprises a first portion configured to face a pole of a trimmer, and a second portion configured to face away from the pole of the trimmer, when the trimmer head is operably coupled onto the trimmer, and wherein the actuator is arranged at the first portion.

6. A trimmer comprising the trimmer head of claim 1, wherein the trimmer is configured to initiate feed of the trimmer line spooled around the trimmer line spool of the trimmer head by performing a change in a rotational speed of the trimmer head, via the interface of the trimmer head, at a higher rate than a threshold rate of the change in the rotational speed.

7. The trimmer head according to claim 1, wherein the trimmer head comprises an inner body operably connected to the trimmer line spool, wherein the inner body is configured to move relative to the housing when the trimmer head is subjected to said change in the rotational speed, via the interface, and wherein the automatic feed mechanism is configured to release the trimmer line spooled around the trimmer line spool when the inner body moves relative to the housing.

8. The trimmer head according to claim 7, wherein the automatic feed mechanism comprises a mechanism body operably connected to the housing and to the inner body.

9. The trimmer head according to claim 8, wherein the actuator is operably connected to the mechanism body.

10. The trimmer head according to claim 8, wherein the mechanism body is movable in a direction of the rotational axis, and wherein the inner body is configured to displace the mechanism body in the direction of the rotational axis when the inner body moves relative to the housing.

11. The trimmer head according to claim 10, wherein the mechanism body comprises at least one first stop and at least one second stop each configured to cooperate with at least one stop arranged on the trimmer line spool, and wherein the at least one second stop is arranged at a distance from the at least one first stop in the direction of the rotational axis, and at a circumferential distance from the at least one first stop around the rotational axis.

12. The trimmer head according to claim 8, wherein the mechanism body is rotationally locked to the housing, or
wherein the actuator is operably connected to the inner body.

13. The trimmer head according to claim 8, wherein the mechanism body comprises a locking lever, and wherein the actuator is operably connected to the locking lever.

14. The trimmer head according to claim 13, wherein the trimmer head further comprises a spring holding member provided with a spring connected to the housing, and wherein the spring holding member connects the actuator to the locking lever.

15. The trimmer head according to claim 14, wherein the spring holding member comprises a centrifugal locking device configured to lock the spring holding member to the inner body when the trimmer head rotates at the rotational speed above a threshold rotational speed.

16. The trimmer head according to claim 13, wherein the trimmer line spool comprises a recess, wherein the recess is provided with at least one radially protruding inner stop on its inner circumferential wall, and at least one radially protruding outer stop on its outer circumferential wall, the at least one inner stop being circumferentially displaced relative to the at least one outer stop, and wherein the locking lever is configured to cooperate with the at least one radially protruding inner stop and the at least one radially protruding outer stop.

17. The trimmer head according to claim 7, wherein the inner body is configured to rotate relative to the housing when the trimmer head is subjected to said change in a rotational speed, via the interface, and wherein the automatic feed mechanism is configured to release the trimmer line spooled around the trimmer line spool when the inner body rotates relative to the housing.

18. The trimmer head according to claim 7, wherein the trimmer head comprises at least one spring configured to counteract a relative movement between the inner body and the housing.

19. The trimmer head according to claim 7, wherein the interface is arranged at the inner body,
wherein the interface is a drive shaft interface, or
wherein the actuator is arranged at a distance from the rotational axis.

20. A trimmer head arranged to be driven around a rotational axis, via an interface, to rotate a trimmer line, wherein the trimmer head comprises:
a housing,
the interface,
a trimmer line spool, and
an automatic feed mechanism,
wherein the automatic feed mechanism is configured to release the trimmer line spooled around the trimmer line spool when the trimmer head is subjected to a change in a rotational speed, via the interface, at a higher rate than a threshold rate of the change in the rotational speed,
wherein the trimmer head further comprises an actuator connected to the automatic feed mechanism such that a manual actuation of the actuator releases the trimmer line spooled around the trimmer line spool, and
wherein the trimmer head comprises a first portion configured to face a pole of a trimmer, and a second portion configured to face away from the pole of the trimmer, when the trimmer head is operably coupled onto the trimmer, and wherein the actuator is arranged at the first portion.

* * * * *